(12) United States Patent
Adams, III et al.

(10) Patent No.: US 7,717,437 B2
(45) Date of Patent: May 18, 2010

(54) ACTUATOR FOR DISCONNECTABLE STABILIZER BAR SYSTEM

(75) Inventors: Herbert L. Adams, III, Waterford, MI (US); Larry G. Haske, Fairgrove, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 447 days.

(21) Appl. No.: 11/745,613

(22) Filed: May 8, 2007

(65) Prior Publication Data

US 2008/0277891 A1 Nov. 13, 2008

(51) Int. Cl.
*B60G 17/015* (2006.01)
*B60G 21/00* (2006.01)

(52) U.S. Cl. .............. 280/5.508; 280/5.502; 280/5.506; 280/5.511; 280/124.106; 280/124.107; 280/124.13; 280/124.149; 280/124.152; 192/53.5; 192/53.6; 192/53.51; 192/54.4; 192/69.6; 192/69.61; 192/69.62; 192/89.2; 192/90

(58) Field of Classification Search .............. 280/5.502, 280/5.506, 5.508, 5.511, 124.106, 124.107, 280/124.13, 124.149, 124.152; 192/53.5, 192/53.6, 53.51, 54.4, 69.6, 69.61, 69.62, 192/89.2, 90
See application file for complete search history.

(56) References Cited

U.S. PATENT DOCUMENTS

| | | | | | |
|---|---|---|---|---|---|
| 232,926 | A | * | 10/1880 | Berkholz | 192/69.62 |
| 456,827 | A | * | 7/1891 | Johnson | 192/99 S |
| 1,993,260 | A | * | 3/1935 | Burns | 267/281 |
| 2,113,071 | A | * | 4/1938 | Allen | 267/194 |
| 2,366,461 | A | * | 1/1945 | Shoreys | 375/371 |
| 2,619,211 | A | * | 11/1952 | Belden | 192/69.62 |
| 2,738,210 | A | * | 3/1956 | Hjembo | 403/335 |
| 2,803,323 | A | * | 8/1957 | Newell | 192/18 R |
| 2,875,876 | A | * | 3/1959 | Rudisch | 192/84.31 |
| 3,085,817 | A | * | 4/1963 | Krause et al. | 280/5.508 |
| 3,180,469 | A | * | 4/1965 | Wiedmann et al. | 192/90 |
| 3,362,143 | A | * | 1/1968 | Gullickson | 56/12.6 |
| 3,643,642 | A | * | 2/1972 | Junes | 123/198 C |
| 4,206,935 | A | * | 6/1980 | Sheppard et al. | 280/5.508 |
| 4,597,480 | A | * | 7/1986 | Schwarz | 192/56.61 |
| 4,667,789 | A | * | 5/1987 | Cucchi et al. | 192/48.91 |
| 4,796,737 | A | * | 1/1989 | Tyler | 192/18 R |
| 4,919,440 | A | | 4/1990 | Tsukamoto | |
| 5,092,625 | A | | 3/1992 | Kawabata | |
| 5,251,926 | A | | 10/1993 | Aulerich et al. | |
| 6,022,030 | A | | 2/2000 | Fehring | |
| 6,039,326 | A | | 3/2000 | Agner | |
| 6,332,343 | B1 | * | 12/2001 | Koketsu et al. | 68/23.7 |
| 6,425,585 | B1 | * | 7/2002 | Schuelke et al. | 280/5.511 |

(Continued)

FOREIGN PATENT DOCUMENTS

DE 100 02 455 A1 7/2001

*Primary Examiner*—Paul N. Dickson
*Assistant Examiner*—Barry Gooden, Jr.
(74) *Attorney, Agent, or Firm*—Harness, Dickey & Pierce, P.L.C.

(57) ABSTRACT

A vehicle stabilizer bar assembly having a pair of stabilizer bar members that are selectively uncoupled via a clutch. The clutch includes a plurality of engagement pins that can be selectively moved via an actuator to effect the uncoupling of the stabilizer bar members. The actuator is configured to apply a force to the moving element concentrically about the axis along which the moving element translates. A method for operating a vehicle stabilizer bar assembly is also provided.

18 Claims, 3 Drawing Sheets

U.S. PATENT DOCUMENTS

| | | |
|---|---|---|
| 6,428,019 B1 | 8/2002 | Kincad et al. |
| 6,439,583 B1 | 8/2002 | Markowetz |
| 6,481,732 B1 | 11/2002 | Hawkins et al. |
| 6,637,757 B2 | 10/2003 | Ignatius et al. |
| 6,874,792 B2 | 4/2005 | Vortmeyer et al. |
| 6,942,227 B2 | 9/2005 | Heller et al. |
| 6,951,341 B1* | 10/2005 | Beetz et al. ............... 280/5.511 |
| 7,100,926 B2 | 9/2006 | Osterlänger et al. |
| 7,150,458 B2* | 12/2006 | Reichel et al. ........... 280/5.511 |
| 2003/0224695 A1* | 12/2003 | Kislevitz et al. ............ 446/437 |
| 2004/0169346 A1* | 9/2004 | Ersoy et al. ........... 280/124.107 |
| 2004/0195796 A1* | 10/2004 | Heo .................... 280/124.106 |
| 2005/0029722 A1* | 2/2005 | Reichel et al. .............. 267/188 |
| 2005/0173226 A1* | 8/2005 | Gold et al. ................... 198/570 |
| 2006/0049601 A1* | 3/2006 | Matsumoto .......... 280/124.106 |
| 2006/0273539 A1* | 12/2006 | Barth et al. ........... 280/124.107 |
| 2007/0018414 A1* | 1/2007 | Yasui et al. .............. 280/5.511 |
| 2007/0108707 A1* | 5/2007 | Kobayashi ............... 280/5.511 |
| 2008/0106055 A1 | 5/2008 | Pinkos et al. |
| 2009/0091093 A1* | 4/2009 | Urababa et al. ......... 280/5.511 |

\* cited by examiner

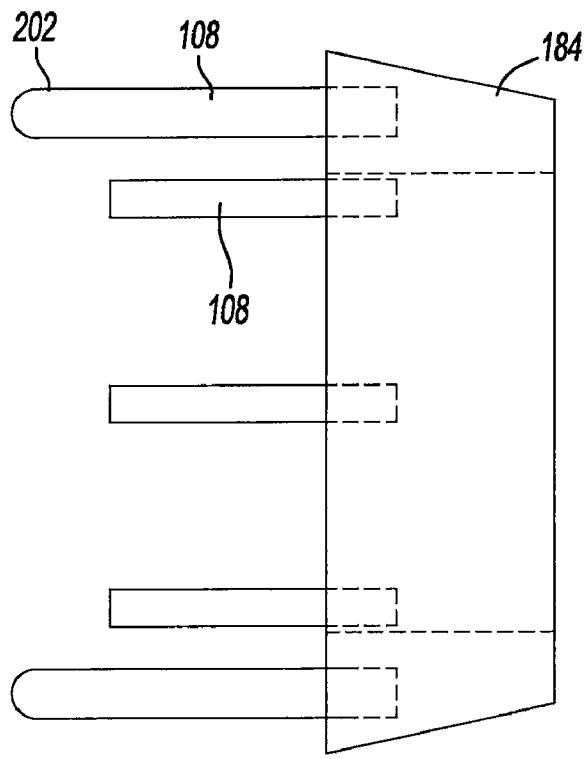
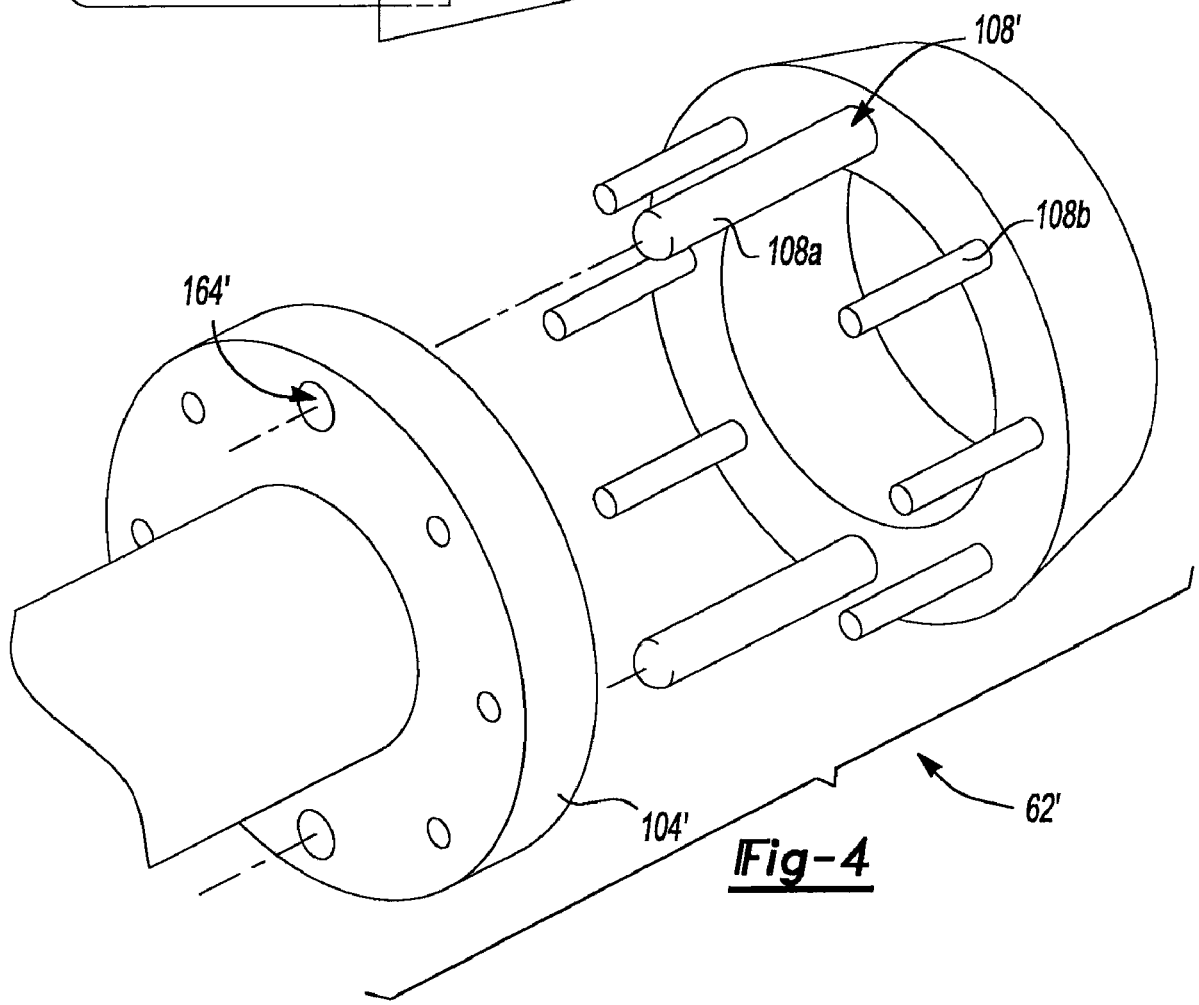
Fig-3
Fig-4

ACTUATOR FOR DISCONNECTABLE STABILIZER BAR SYSTEM

INTRODUCTION

The present invention generally relates to vehicle suspension systems and more particularly to an anti-roll suspension system having a pair of independently mounted stabilizer bar halves that can be selectively de-coupled from one another.

Traditional vehicle suspension systems include resilient devices, such as coil springs and leaf springs, to flexibly support a portion of a vehicle. These devices enable all of the vehicle wheels to maintain contract with the ground when traversing uneven terrain. Segregating the vehicle into unsprung and sprung portions in this manner is also useful for preventing severe impulsive forces from being transmitted to the vehicle occupants.

It is known that when vehicle travels around a corner, centrifugal forces acting on the vehicle tend to cause the sprung portion of the vehicle to roll. In severe instances, the effects of roll can cause instability and impede the ability of the driver to control the vehicle. Although the effects of roll are more pronounced with vehicles having a comparatively high center of gravity, such as vans or trucks, every vehicle is affected by roll.

In tuning the ride and handling of a vehicle, it is often desirable to soften or lower the spring rate of the suspension's springs to provide a softer, less harsh ride. One of the main drawbacks associated with this approach is that a suspension system having springs with a relatively low spring rate permits the vehicle body to roll at a relatively higher angle. Accordingly, it would seem that the combination of springs with a very low spring rate and a relatively stiff stabilizer bar would optimize both the ride and handling of the vehicle.

The relatively stiff stabilizer bar, however, tends to directly connect the vehicle wheels such that the motion of one wheel is copied to another wheel. If a vehicle so equipped was to strike a bump with one wheel, for example, the upward force (i.e., jounce) imparted to that wheel would be transmitted through the stabilizer bar to the opposite wheel, causing the opposite wheel to move in an upward direction. When both vehicle wheels associated with a stabilizer bar strike a bump simultaneously, the stabilizer bar has no effect.

Another aspect of stabilizer bars is that their torsional stiffness inhibits the free travel of the vehicle wheels in relation to one another. On the relatively flat surfaces of modern roads, this is not a factor but it can become one when the vehicle is operated over un-even terrain. In some situations, it is possible for one of the vehicle wheels to remain in an elevated position over a dip in the terrain due to the torsional resistance of the stabilizer bar. While situations of this severity are not routinely encountered, the fact remains that the stabilizer bar can reduce vehicle traction in some situations.

Various solutions that address the aforementioned drawbacks are disclosed in U.S. Pat. No. 6,428,019 entitled "Semi-Active Anti-Roll System" and U.S. Pat. No. 6,637,757 entitled "Apparatus And Method For Coupling A Disconnectable Stabilizer Bar System", the disclosures of which are hereby incorporated by reference as if fully set forth in detail herein. Stabilizer bar products incorporating one or more innovations disclosed in the '019 and/or the '757 patents are commercially manufactured and marketed by American Axle & Manufacturing under the SmartBar™ product line. While such configurations are suitable for their intended purpose, they are nonetheless susceptible to improvement.

SUMMARY

In one form, the present teachings provide a stabilizer bar assembly for a vehicle having a pair of laterally-spaced wheels. The stabilizer bar assembly includes a first stabilizer bar, which is coupled to a first one of the pair of laterally-spaced wheels, a second stabilizer bar, which is coupled to a second one of the pair of laterally-spaced wheels, and a clutch assembly that couples the first and second stabilizer bars. The clutch assembly can be operated in a first condition in which the first and second stabilizer bars are permitted to rotate independently of one another and a second condition in which the first and second stabilizer bars are coupled for rotation with one another. The clutch includes a clutch housing, a first coupling flange, a second coupling flange, a coil assembly, a plurality of engagement pins and a spring. The clutch housing defines a cavity in which the first and second coupling flanges are disposed. The first coupling flange being coupled for rotation with the first stabilizer bar and defines a first set of pin apertures. The second coupling flange is coupled for rotation with the second stabilizer bar and defines a second set of pin apertures. The coil assembly is disposed about the first stabilizer bar and includes a coil and an armature. The engagement pins are fixedly coupled to the armature for translation therewith. The engagement pins are received in the first set of pin apertures. The spring biases the armature in a direction that facilitates engagement of the engagement pins in the second set of pin apertures to thereby inhibit relative rotation between the first and second stabilizer bars. The coil assembly may be selectively activated to move the armature to withdraw the engagement pins from the second set of pin apertures to thereby permit relative rotation between the first and second stabilizer bars.

In another form, the present disclosure provides a method for operating a stabilizer bar assembly for a vehicle having a pair of laterally-spaced wheels. The method includes: coupling the stabilizer bar assembly to the laterally-spaced wheels, the stabilizer bar assembly including a first stabilizer bar, a second stabilizer bar and a clutch, the clutch including a first coupling flange, a second coupling flange and a plurality of engagement pins, the first coupling flange being coupled to the first stabilizer bar, the second coupling flange being coupled to the second stabilizer bar, the engagement pins disposed circumferentially about the first coupling flange and being received at least partially through the first coupling flange; simultaneously translating the engagement pins in a first direction to de-couple the first and second stabilizer bars; and simultaneously translating the engagement pins in a second direction opposite the first direction to cause the engagement pins to non-rotatably couple the first and second stabilizer bar.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a side elevation view of a portion of an alternately constructed anti-roll system constructed in accordance with the teachings of the present disclosure illustrating a set of engagement pins having longer pins with a locating feature; and FIG. 4 is an exploded perspective view of a portion of another alternately constructed anti-roll system constructed in accordance with the teachings of the present disclosure illustrating a keying set of engagement pins.

DETAILED DESCRIPTION OF THE VARIOUS EMBODIMENTS

Figure 1:
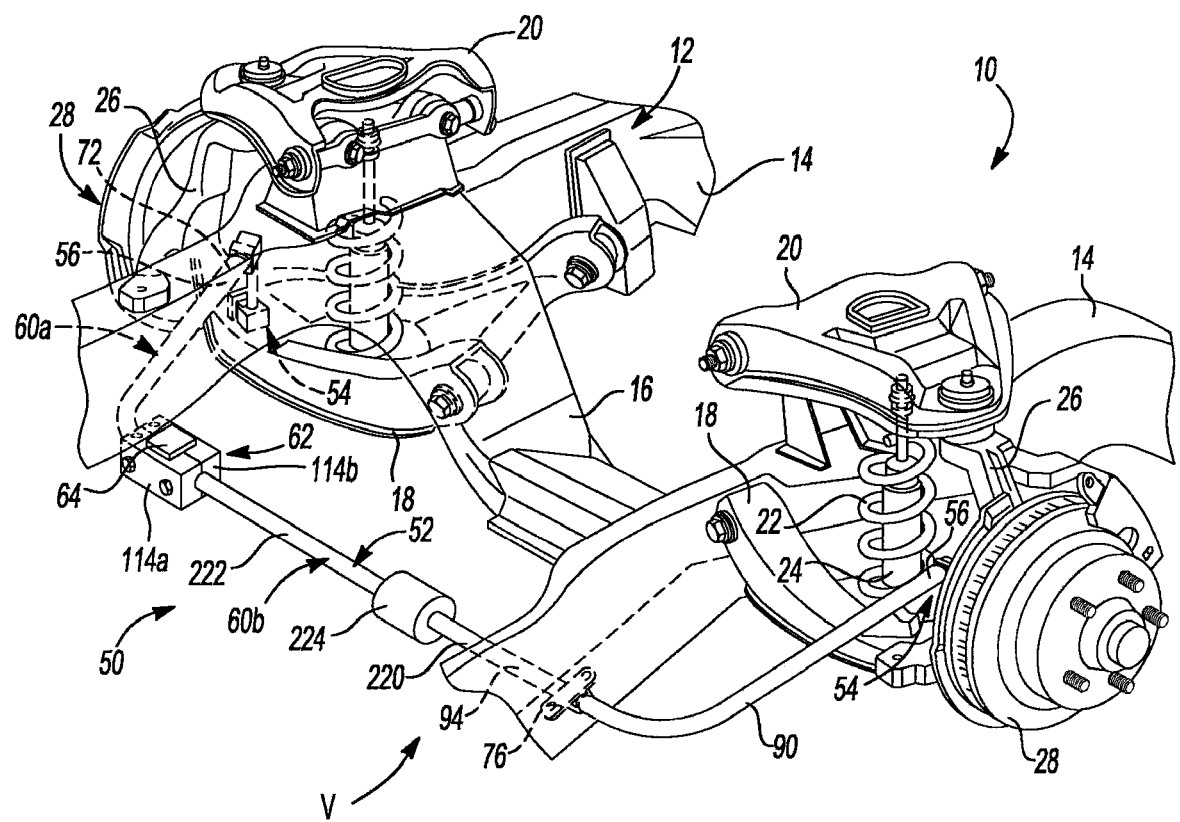
FIG. 1 is a perspective view of a portion of a vehicle having an independent suspension with an anti-roll system constructed in accordance with the teachings of the present disclosure.

With reference to FIG. 1 of the drawings, an exemplary vehicle V is shown and can include an independent front suspension system 10. The independent front wheel suspension can be of a type having suspension components at each wheel that are suspended from the vehicle frame structure 12. In the particular example provided, the frame structure 12 can include a pair of longitudinal side rails 14 and a crossbeam 16, but those of ordinary skill in the art will appreciate that the term "frame structure" need not refer to a frame as such, but could also refer to one or more regions of the vehicle body that act as an integrated frame structure. Those of ordinary skill in the art will appreciate that although a front suspension system is illustrated and described herein, the teachings of the present disclosure are also applicable to a rear suspension system.

At each wheel, the suspension system 10 can include a lower control arm 18 and an upper control arm 20. The lower and upper control arms 18 and 20 can be pivotally attached to the frame structure 12. A strut assembly, which can have a helical coil spring 22 and a strut damper 24, can be retained between an intermediate portion of the lower control arm 18 and the frame structure 12 to support the weight of the vehicle body (not shown) and any loads that are transmitted through the lower control arm 18. The upper control arm 20 can be connected to the lower control arm 18 by a steering knuckle 26. A hub and rotor assembly 28 can be rotatably attached to a spindle portion (not specifically shown) of the steering knuckle 26 such that a wheel and tire (not shown) may be mounted thereon. The suspension system 10 can further include an anti-roll system 50 that can include a stabilizer bar assembly 52 and a pair of end links 54 that can connect the ends 56 of the stabilizer bar assembly 52 to the lower control arms 18. The stabilizer bar assembly 52 can include first and second stabilizer bar members 60a and 60b, respectively, a clutch assembly 62 and a controller assembly 64.

Figure 2:
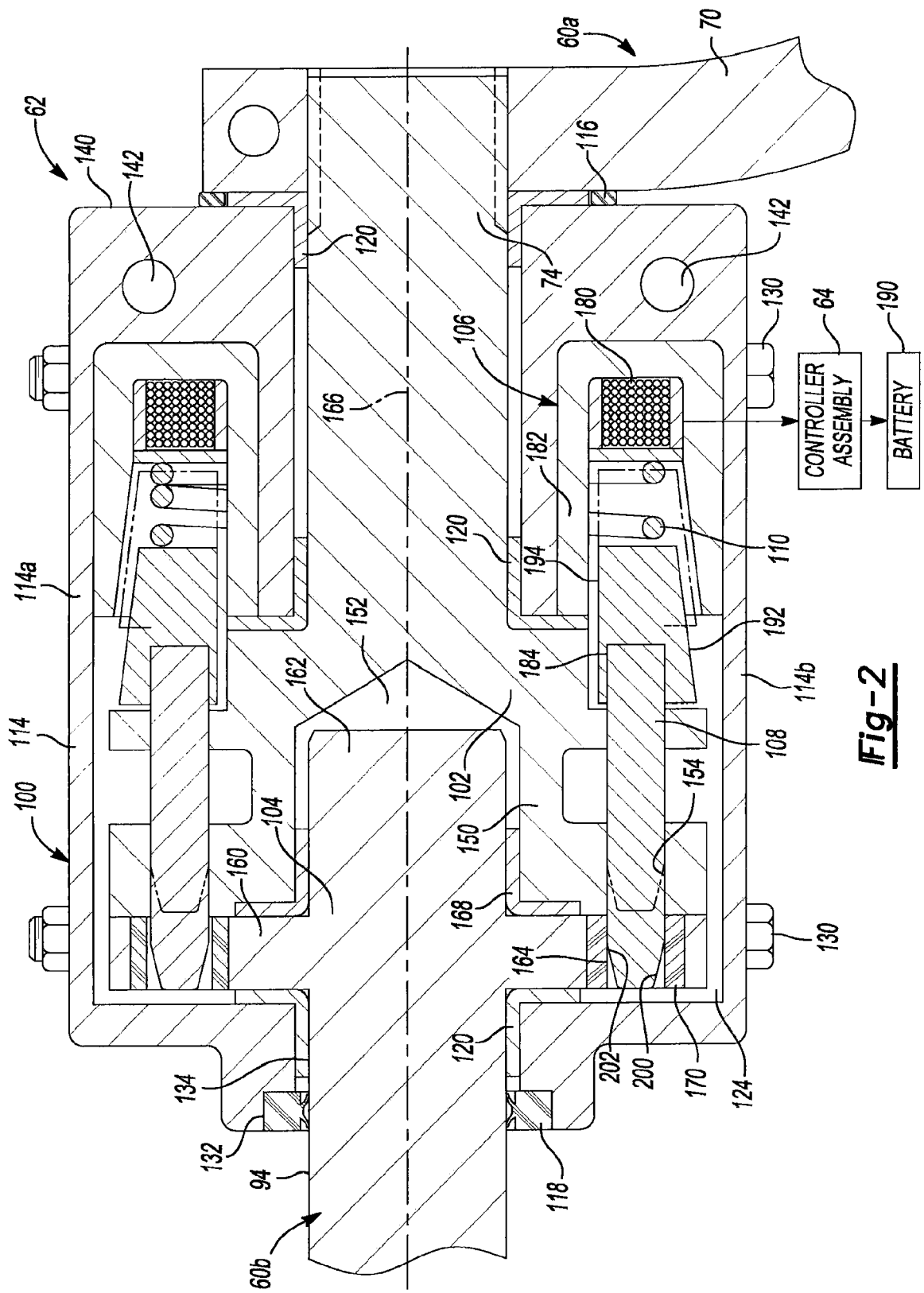
FIG. 2 is a longitudinal sectional view of a portion of the anti-roll system of FIG. 1.

With additional reference to FIG. 2, the first stabilizer bar member 60a can be generally L-shaped, having an arm portion 70, which can have a mounting portion 72, and a leg portion 74 that can be coupled to an end of the arm portion 70 opposite the mounting portion 72. The mounting portion 72 can be configured to be coupled to the frame structure 12 in a conventional manner, such as the end link 54. The leg portion 74 can be rotatably coupled to the frame structure 12 as will be described in more detail, below.

The second stabilizer bar member 60b can also be generally L-shaped and have an arm portion 90 and a leg portion 94. The arm portion 90 can be similar to the arm portion 70 of the first stabilizer bar member 60a. The leg portion 94 can be coupled to an end of the arm portion 90 opposite the end 56 at which the arm portion 90 is coupled to the end link 54. The leg portion 94 can be rotatably coupled to the frame structure 12 in a conventional manner (such as a bracket 76).

The clutch assembly 62 can include a housing assembly 100, a first coupling member 102, a second coupling member 104, a coil assembly 106, a plurality of engagement pins 108 and a biasing spring 110.

The housing assembly 100 can include a clutch housing 114, one or more seal members, such as 116 and 118, and one or more bearings 120. The clutch housing 114 can define a housing cavity 124 in which the first and second coupling members 102 and 104 can be received. In the particular example provided, the clutch housing 114 includes a first housing member 114a and a second housing member 114b that can be coupled to one another in a clam-shell manner via a plurality of bolts 130. The seal members 116 and 118 can be any type of appropriate seal and can be provided to inhibit the ingress of dirt, debris and water into the housing cavity 124. In the particular example provided, the seal 116 is employed to seal an interface between the clutch housing 114 and the arm portion 70 of the first stabilizer bar 60a, while the seal 118 is received in the clutch housing 114 and sealingly engages a surface 132 of a bore 134 formed through the clutch housing 114 and the second stabilizer bar 60b. The bearings 120 can be any type of bearing and can be configured to support the first and second stabilizer bars 60a and 60b and the first and second coupling members 102 and 104.

The clutch housing 114 can include a mounting portion 140 that can have a plurality of mounting holes 142 that can be employed to fixedly but removably couple the clutch housing 114 to the vehicle V. In the example provided, conventional fasteners (not shown) are received through the mounting holes 142 to couple the clutch housing 114 to the frame structure of the vehicle V. It will be appreciated that such mounting eliminates the need for a discrete fastening or coupling of the stabilizer bar 60a to the frame structure of the vehicle V.

The first coupling member 102 can be coupled for rotation with the leg portion 74 of the first stabilizer bar 60a and can be received in the housing cavity 124. The first coupling member 102 can include a first annular flange 150, a central bore 152 and a first set of pin apertures 154 that can be formed through the first annular flange 150.

The second coupling member 104 can be coupled for rotation with the leg portion 94 of the second stabilizer bar 60b and can be received in the housing cavity 124. The second coupling member 104 can include a second annular flange 160, a central stem 162 and a second set of pin apertures 164 that can be formed through the second annular flange 160. The central stem 162 can be received in the central bore 152 to align the first and second coupling members 102 and 104 about a rotational axis 166. A bearing 168 can be disposed between the first and second coupling members 102 and 104 to rotationally support the central stem 162 and distribute thrust forces to the first and second coupling members 102 and 104. In the particular example provided, the second coupling member 104 includes a plurality of bushings 170 that are received in the second annular flange 160. The bushings 170 can define the second set of pin apertures 164 and can be formed of a desired material, such as a plastic, to reduce or eliminate noise. In the example provided, the plastic material is NYLON®.

The coil assembly 106 can be disposed about the leg portion 74 of the first stabilizer bar 60a and can include an annular coil 180, an annular shell 182 and an armature 184. The annular coil 180 is electrically coupled to the controller assembly 64 and received in the annular shell 182. The controller assembly 64 controls the application of electric power provided by a power source, such as a battery 190, to cause the annular coil 180 to generate a magnetic field that attracts the armature 184. In the particular example provided, the armature 184 has an outer circumferential surface 192 that tapers inwardly toward an inner circumferential surface 194 of the armature 184 with increasing distance from a distal end of the engagement pins 108. It will be appreciated that the annular shell 182 can have a correspondingly tapered surface. The tapered surfaces of the armature 184 and the annular shell 182 provide relatively greater surface area over which the magnetic field may be applied so that the coil assembly 106 will have sufficient strength to translate the armature 184 over a desired range.

The engagement pins 108 can be fixedly coupled to the armature 184 and spaced about the circumference of the armature 184 so that they are received in the first and second sets of pin apertures 154 and 164. One or more of the engagement pins 108 can include a distal end 200 having a locating feature 202 that facilitates alignment of the distal end 200 to the second set of pin apertures 164. In the example provided, the locating feature 202 is a taper, such as about 20 to about 15°, and the locating feature 202 is formed on all of the engagement pins 108. It will be appreciated, however, that other types of locating features, such as a radius, a spherical radius or a chamfer could be employed on one or more of the engagement pins 108. If the locating feature 202 is employed on fewer than all of the engagement pins 108, then one or more of the engagement pins 108 can extend from the armature 184 by a distance that exceeds a distance by which the remaining engagement pins 108 extend from the armature 184 as shown in FIG. 3.

Returning to FIGS. 1 and 2, the biasing spring 110 can be any type of spring that can bias the armature 184 outwardly from the annular coil 180 such that the engagement pins 108 are received in the first and second sets of pin apertures 154 and 164. In the particular example provided, the biasing spring 110 is a helical compression spring that is disposed axially between the annular coil 180 and the armature 184.

The controller assembly 64 can respond to various automatic and/or manual inputs to selectively control the annular coil 180. When the annular coil 180 is activated, the armature 184 can move in a direction away from the second coupling member 104 to cause the engagement pins 108 to withdraw from the second set of pin apertures 164 to thereby permit relative rotation between the first and second stabilizer bars 60*a* and 60*b*.

It will be appreciated that the controller assembly 64 could include various sensors (not shown) to identify the position of the armature 184 and/or the engagement pins 108 to determine the state in which the clutch assembly 62 is operating and/or to control the power that is supplied to the annular coil 180.

It will be appreciated that the second coupling member 104 could be integrally formed with the second stabilizer bar 60*b*. Depending on the geometry of the stabilizer bar 60*b*, it may be difficult in some situations to maintain the desired relationship between the arm member 90 and the second set of pin apertures 164. In such situations, it may be desirable to include a means for permitting both rotational and axial movement to permit the stabilizer bar assembly 50 to be properly fitted to the vehicle V, as well as provide a desired relationship between the arm member 90 and the second set of pin apertures 164. One such means is described in co-pending Provisional Patent Application Ser. No. 60/857,149 filed Nov. 6, 2006 entitled "Apparatus And Method For Coupling A Disconnectable Stabilizer Bar", the disclosure of which is hereby incorporated by reference as if fully set forth in detail herein. Briefly, the second stabilizer bar 60*b* can include a first bar portion 220, a second bar portion 222 and an adapter 224 that is configured to non-rotatably but axially slidably couple the first and second bar portions 220 and 222 in a manner that permits an associated one of the first and second bar portions 220 and 222 to be positioned in a desired rotational orientation.

A portion of another clutch assembly constructed in accordance with the teachings of the present disclosure is illustrated in FIG. 4 in which the set of engagement pins 108' is key-able to the second set of pin apertures 164'. In the example provided, the set of engagement pins 108' includes a pair of engagement pins 108*a* have a first diameter and a remainder of the engagement pins 108*b* have a second diameter that is smaller than the first diameter. The larger diameter engagement pins 108*a* permit the coupling of the clutch assembly when the second coupling member 104' is located in one or more predetermined positions. It will be appreciated that the larger diameter engagement pins 108*a* can be relatively longer than the remaining engagement pins 108*b*. It will also be appreciated that various modifications in size, shape, and/or location of one or more of the engagement pins 108' can be employed to effect a keying function.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A stabilizer bar assembly for a vehicle having a pair of laterally-spaced wheels, the stabilizer bar assembly comprising:

a first stabilizer bar adapted to be coupled to a first one of the pair of laterally-spaced wheels;

a second stabilizer bar adapted to be coupled to a second one of the pair of laterally-spaced wheels; and a clutch assembly coupled to the first and second stabilizer bars, the clutch assembly operable in a first condition wherein the first and second stabilizer bars are permitted to rotate independently of one another and the clutch assembly operable in a second condition where the first and second stabilizer bars are coupled for rotation with one another;

wherein the clutch includes a clutch housing, a first coupling flange, a second coupling flange, a coil assembly, a plurality of engagement pins and a spring, the clutch housing defining a cavity in which the first and second coupling flanges are disposed, the first coupling flange being coupled for rotation with the first stabilizer bar and defining a first set of pin apertures, the second coupling flange being coupled for rotation with the second stabilizer bar and defining a second set of pin apertures, the coil assembly including an annular coil and an armature, the annular coil being disposed concentrically about a rotational axis of the first stabilizer bar, the engagement pins being fixedly coupled to the armature for translation therewith, the engagement pins being received in the first set of pin apertures, the spring biasing the armature in a direction that facilitates engagement of the engagement pins in the second set of pin apertures to thereby inhibit relative rotation between the first and second stabilizer bars; and wherein the coil assembly may be selectively activated to move the armature to withdraw the engagement pins from the second set of pin apertures to thereby permit relative rotation between the first and second stabilizer bars.

2. The stabilizer bar assembly of claim 1, wherein the first stabilizer bar includes an arm member and a shaft member that is non-rotatably coupled to the arm member.

3. The stabilizer bar assembly of claim 1, wherein a portion of one of the first and second coupling flanges is received in the other one of the first and second coupling flanges to locate the first and second coupling flanges to one another about a rotational axis.

4. The stabilizer bar assembly of claim 1, wherein at least a portion of the engagement pins have a tapered end that is located opposite the armature.

5. The stabilizer bar assembly of claim 4, wherein all of the engagement pins include the tapered ends.

6. The stabilizer bar assembly of claim 4, wherein the portion of the engagement pins that include the tapered ends are relatively longer than a remaining portion of the engagement pins to permit the portion of the engagement pins that include the tapered ends to engage the second set of pin apertures before the remaining portion of the engagement pins.

7. The stabilizer bar assembly of claim 1, wherein the engagement pins are keyed to the second set of pin apertures to permit the coupling of the first and second coupling flanges in at least one desired orientation.

8. The stabilizer bar assembly of claim 1, further comprising a first bearing set disposed between the second stabilizer bar and the clutch housing.

9. The stabilizer bar assembly of claim 1, further comprising a shaft seal received in the clutch housing and sealingly engaging the second stabilizer bar.

10. The stabilizer bar assembly of claim 1, wherein the armature has an outer circumferential surface and an inner circumferential surface and wherein the outer circumferential surface tapers inwardly toward the inner circumferential surface with increasing distance from a distal end of the engagement pins.

11. The stabilizer bar assembly of claim 1, wherein the clutch housing includes a mounting block having mounting holes formed therein, the mounting block being adapted to mount an end of the first stabilizer bar to the vehicle.

12. The stabilizer bar assembly of claim 1, wherein the second coupling flange includes a plurality of bushings for receiving the engagement pins, the bushings defining the second set of pin apertures.

13. The stabilizer bar assembly of claim 12, wherein the bushings are at least partially formed of a plastic material.

14. The stabilizer bar assembly of claim 13, wherein the plastic material is nylon.

15. The stabilizer bar assembly of claim 1, wherein one of the first and second stabilizer bars includes a first bar portion, a second bar portion and an adapter, the adapter being configured to non-rotatably but axially slidably couple the first and second bar portions in a manner that permits an associated one of the first and second bar portions to be oriented into a desired rotational orientation.

16. The stabilizer bar assembly of claim 1, wherein the clutch housing is secured to a vehicle structure to at least partially couple at least one of the first and second stabilizer bars to the vehicle structure.

17. A stabilizer bar assembly for a vehicle having a pair of laterally-spaced wheels, the stabilizer bar assembly comprising:

a first stabilizer bar adapted to be coupled to a first one of the pair of laterally— spaced wheels;

a second stabilizer bar adapted to be coupled to a second one of the pair of laterally-spaced wheels; and a clutch assembly coupled to the first and second stabilizer bars, the clutch assembly operable in a first condition wherein the first and second stabilizer bars are permitted to rotate independently of one another and the clutch assembly operable in a second condition where the first and second stabilizer bars are coupled for rotation with one another;

wherein the clutch assembly includes a clutch housing, a first coupling flange, a second coupling flange, a coil assembly, a plurality of engagement pins and a spring, the clutch housing defining a cavity in which the first and second coupling flanges are disposed, the first coupling flange being coupled for rotation with the first stabilizer bar and defining a first set of pin apertures, the second coupling flange being coupled for rotation with the second stabilizer bar and defining a second set of pin apertures, the coil assembly including a coil, disposed concentrically about the first stabilizer bar, and an armature, disposed concentrically about the first stabilizer bar, the engagement pins being fixedly coupled to the armature for translation therewith, the engagement pins being received in the first set of pin apertures, the spring biasing the armature in a direction that facilitates engagement of the engagement pins in the second set of pin apertures to thereby inhibit relative rotation between the first and second stabilizer bars;

wherein the coil assembly may be selectively activated to move the armature to withdraw the engagement pins from the second set of pin apertures to thereby permit relative rotation between the first and second stabilizer bars;

wherein at least a portion of the engagement pins have a tapered end that is located opposite the armature; and wherein a portion of one of the first and second coupling flanges is received in the other one of the first and second coupling flanges to locate the first and second coupling flanges to one another about a rotational axis.

18. The stabilizer bar assembly of claim 17, wherein the engagement pins are keyed to the second set of pin apertures to permit the coupling of the first and second coupling flanges in at least one desired orientation.

* * * * *